United States Patent
Metcalfe et al.

(10) Patent No.: US 10,086,607 B1
(45) Date of Patent: Oct. 2, 2018

(54) SYSTEM AND METHOD FOR CONTROL OF INKJETS IN INKJET PRINTERS

(71) Applicant: Xerox Corporation, Norwalk, CT (US)

(72) Inventors: David J. Metcalfe, Marion, NY (US); John F. Seward, Jr., Dansville, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/639,235

(22) Filed: Jun. 30, 2017

(51) Int. Cl.
*B41J 2/045* (2006.01)

(52) U.S. Cl.
CPC ....... *B41J 2/04595* (2013.01); *B41J 2/04536* (2013.01); *B41J 2/04586* (2013.01)

(58) Field of Classification Search
CPC . B41J 2/04595; B41J 2/04586; B41J 2/04536
See application file for complete search history.

(56) References Cited

U.S. PATENT DOCUMENTS

| | | | |
|---|---|---|---|
| 4,203,154 A | 5/1980 | Lampson et al. | |
| 5,153,421 A * | 10/1992 | Tandon | H01L 27/148 250/208.1 |
| 5,440,329 A * | 8/1995 | Meggitt | B41J 2/325 347/212 |
| 5,732,162 A | 3/1998 | Curry | |
| 5,963,713 A | 10/1999 | Inose et al. | |
| 6,502,920 B1 | 1/2003 | Anderson et al. | |
| 7,387,361 B1 | 6/2008 | Rueby et al. | |
| 8,400,678 B2 | 3/2013 | Loce et al. | |
| 8,651,608 B2 | 2/2014 | Miller et al. | |
| 8,651,615 B2 | 2/2014 | Elliot et al. | |
| 8,714,692 B1 | 5/2014 | Metcalfe et al. | |
| 8,939,530 B2 | 1/2015 | Goh | |
| 8,955,937 B2 | 2/2015 | Metcalfe et al. | |
| 8,985,723 B2 | 3/2015 | Metcalfe et al. | |
| 2003/0175602 A1 | 9/2003 | Kazama | |
| 2005/0270329 A1 | 12/2005 | Hoisington et al. | |
| 2011/0254889 A1 * | 10/2011 | Miller | G06K 15/1898 347/14 |

* cited by examiner

*Primary Examiner* — Henok Legesse
(74) *Attorney, Agent, or Firm* — Maginot Moore & Beck LLP

(57) ABSTRACT

An inkjet printer that is configured to perform multi-pass printing operations includes at least one printhead, a memory and a controller. The controller receives a input row of image data for one pass including a plurality of pixels. The controller uses a table of index lookup offsets in the memory to generate a row of output image data with at least one pixel at a first index in the input row being located at a second index in the output row. The controller operates the inkjets in the printhead to eject at least one drop of ink using an inkjet in the printhead that corresponds to the second index in the output row and that is different than another inkjet in the printhead that corresponds to the first index in the input row.

12 Claims, 8 Drawing Sheets

SYSTEM AND METHOD FOR CONTROL OF INKJETS IN INKJET PRINTERS

TECHNICAL FIELD

This disclosure is directed to inkjet printheads used in printers and additive manufacturing systems and, more particularly, to systems and methods for generating non-firing signals prior to improve the subsequent operation of inkjets in the printhead.

BACKGROUND

Inkjet printers employ printheads in a wide range of applications to form printed documents and, more recently, have found new uses in various types of manufacturing including additive manufacturing systems that are popularly referred to as "3D printers." Modern inkjet printheads are complex microfluidic devices that often include hundreds or thousands of inkjets, each of which emits drops of ink at precise times in response to firing electrical signals to form high-quality printed images or manufactured articles.

Many printers employ a multi-pass strategy in which a single printhead or array of printheads move over a printed image multiple times to eject ink drops onto the image during each pass. The printheads or the image receiving member that receives the printed image move laterally between each pass to reposition the inkjets in the printheads between each pass so that a single set of inkjets in each printhead can eject ink drops onto different locations in the printed image during multiple passes. In traditional multi-pass printer processes, each printhead forms a portion of the printed image based on a portion of a larger set of two-dimensional image data during a first pass and another portion of the printed image in subsequent passes using interleaving of the image data. For example, in a simple two-pass configuration a prior-art printer uses column numbers 0, 2, 4, 6, etc. in the image data as input data to control the printheads during a first pass. The printer subsequently shifts the printheads laterally and operates the printheads to form the remainder of the image using column numbers 1, 3, 5, 7, etc. in the image data during the second pass.

While multi-pass printing systems are generally known to the art, some multi-pass printing operations cannot be performed using the simple interleaving process that is described above. More complex multi-pass processes do not merely divide the image data into regularly spaced subsets of columns. These multi-pass processes present challenges to the use of traditional printheads since changing the parameters for printing portions of the image data between passes would require extensive and impractical hardware changes to the structures of the printheads themselves. Consequently, improvements to inkjet printers to enable complex multi-pass printing operations without requiring internal changes to the designs of printheads would be beneficial.

SUMMARY

In one embodiment, an inkjet printer that is configured to perform multi-pass printing operations has been developed. The printer includes a printhead including a plurality of inkjets, a memory, and a controller operatively connected to the printhead and the memory. The memory is configured to store a plurality of image data including a first plurality of pixels corresponding to a first row in an image to be formed during a first pass of the printhead, each pixel in the first plurality of pixels being stored at one index in a first plurality of index values for the first row, each index corresponding to one inkjet in the plurality of inkjets and a first table of index offset data including a first plurality of entries, each entry in the first plurality of entries corresponding to one index in the first plurality of index values and storing an index offset value. The controller is configured to retrieve a first pixel stored at a first index in the first plurality of pixels from the memory, generate first output image data including a second plurality of pixels with the first pixel being stored in the output image data at a second index in the output image data with reference to the first index and an index offset value from an entry in the first table corresponding to the first index, and operate the second inkjet in the printhead to eject at least one ink drop with reference to the first pixel at the second index in the first output image data during the first pass of the printhead in the inkjet printer, the second inkjet being different than the first inkjet.

In another embodiment, a method for operating an inkjet printer to perform multi-pass printing operations has been developed. The method includes retrieving, with a controller, a first pixel from a first index in a first plurality of pixels stored in a memory, the first plurality of pixels corresponding to a first row in an image to be formed during a first pass of a printhead, the first index of the first pixel corresponding to a first inkjet in a plurality of inkjets in the printhead, identifying, with the controller, a first index offset value for the first pixel with reference to a first table of index offset data stored in the memory and the first index of the first pixel, generating, with the controller, first output image data including a second plurality of pixels with the first pixel being stored in the output image data at a second index in the output image data with reference to the first index and the first index offset value, the second index corresponding to a second inkjet in the plurality of inkjets in the printhead, and operating, with the controller, the second inkjet in the printhead to eject at least one ink drop with reference to the first pixel at the second index in the first output image data during the first pass of the printhead in the inkjet printer, the second inkjet being different than the first inkjet.

BRIEF DESCRIPTION OF THE DRAWINGS

The foregoing aspects and other features of an inkjet printer and method of operating the inkjet printer during multi-pass printing are explained in the following description, taken in connection with the accompanying drawings.

DETAILED DESCRIPTION

Figure 1:
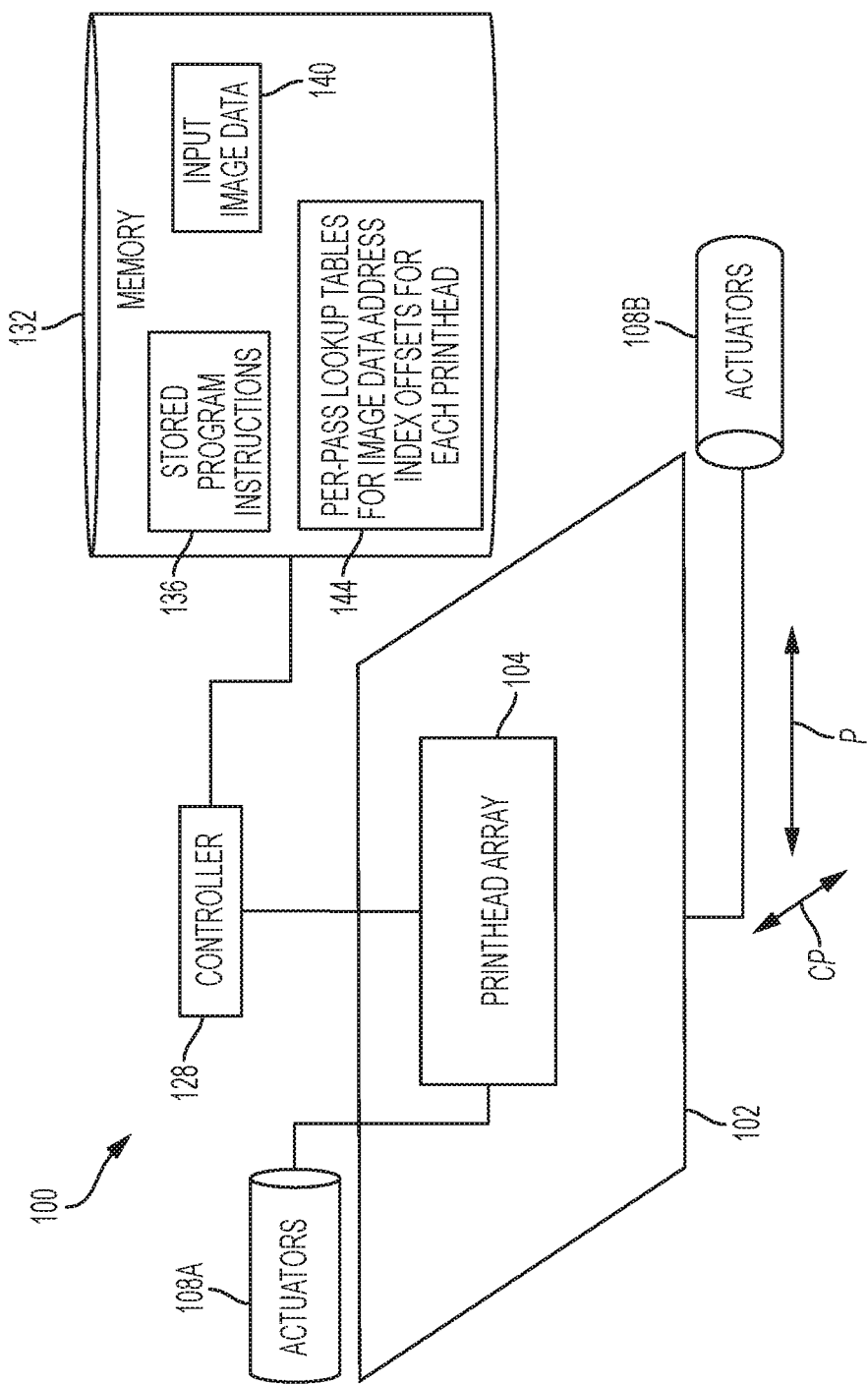
FIG. 1 is a schematic diagram of an inkjet printer that is configured to perform multi-pass printing operations.

For a general understanding of the environment for the device disclosed herein as well as the details for the device, reference is made to the drawings. In the drawings, like reference numerals designate like elements.

As used herein, the term "printhead" refers to a microfluidic device that includes an array of inkjets. Each inkjet ejects drops of liquefied material in response to a signal from a control device in the printer. As is known in the art, arrays of inkjets in one or more printheads eject drops of material in patterns based on image data to form two-dimensional images, where the term "printed images" refers to both text and graphics in traditional printing applications as well as printed layers of material that form three-dimensional printed objects. An inkjet printer uses at least one printhead and, in some embodiments, an array of printheads to form printed images using one or more types of material to form printed images or to form three-dimensional objects during an additive manufacturing process. The inkjets eject liquefied ink drops in predetermined patterns based on digital image data to form the printed image.

As used herein, the term "ink" refers to a wide range of materials that are ejected from inkjets in a printhead as liquefied drops to form a printed image or form part of a structure of an object in an additive manufacturing process. Different types of inks include, for example, aqueous, phase-change, and solvent based inks of one or more colors with a non-limiting example being cyan, magenta, yellow, and black (CMYK) inks. During an additive manufacturing process, the printhead ejects types of ink that refer to liquefied materials including, but no limited to, thermoplastics, waxes, colloidal suspensions including solid particles suspended in a liquid carrier, and the like.

As used herein, the term "pass" refers to an operation of a printer to form a portion of a printed image on an image receiving surface while one or more printheads in the printer and the image receiving surface move in the process direction relative to one another while the printheads eject drops of material onto the image receiving surface to form a portion of the printed image. Some printer embodiments employ a multi-pass printing process. In the multi-pass printing process, the printer 100 performs a first pass with the printheads to form a first portion of the printed image. The printer subsequently operates one or more actuators to translate the printheads or an underlying image receiving member in a cross-process direction to shift the locations of the inkjets in the printheads. In a subsequent pass, the printheads in the printer and the image receiving surface move in the process direction relative to one another while the printheads eject drops of material onto the image receiving surface to form another portion of the printed image. Since the printheads have been shifted to another location in the cross-process direction, the inkjets eject drops onto different locations of the image receiving member during the second pass than in the first pass. The shift in the cross-process direction interleaves the locations of inkjets in the printheads over time to effectively increase the resolution of the printheads in the printer. Multi-pass printing systems form printed images using at least two passes, although some multi-pass printing configurations use more than two passes, with one illustrative embodiment using sixteen passes by way of example. The embodiments described below include printers and processes for operating printers that enable operation during complex multi-pass printing processes that dynamically adjust the mappings between image data and inkjets in the printheads during different passes of the multi-pass printing process.

As used herein, the term "process direction" refers to a relative direction of movement between one or more printheads in the printer and an image receiving member as the printer operates the printheads to eject drops of ink or other materials onto a surface of the image receiving member. In a multi-pass printer configuration, the process direction may change between different passes, such as in a printer that employs a reciprocating motion between printhead passes. In many printer configurations, the relative motion between the printheads and the image receiving surface in the process direction is a straight line during each pass, although this is not a strict requirement. As used herein, the term "cross-process direction" refers to an axis that is perpendicular to the process direction and parallel to the surface of the image receiving member. In many printer configurations, the inkjets in a printhead and arrays of multiple printheads are arranged along the cross-process direction to enable the printheads to eject drops of ink that form a series of printed rows in the image during each pass. One or more actuators in the printer shift the printheads or the image receiving surface along the cross-process direction axis between passes to reposition the inkjets in the printheads for each pass.

As used herein the term "index" refers to a digital datum that defines at least a portion of a memory address for a particular piece of data stored in a digital memory device. One piece of data stored in a digital memory for a printer is a pixel of image data that corresponds to, for example, a single binary bit value in larger two-dimensional bitmap that controls the generation of firing signals in a printhead, or more complex 8-bit, 16-bit, 24-bit, etc. values that encode color information at a pixel location in contone image data. For example, as is known in the art a memory address for a pixel is often encoded as a 32-bit or 64-bit value that maps to cells in a random access memory (RAM) device or other digital data storage device that actually store the data for the pixel. The index includes all or a portion of the memory address for the pixel that identifies the relative location of the pixel in at least one of a column or row of image data in the printed image. For example, a row of pixels in the image data corresponds to a single line of ink drops of an image formed by a multiple of inkjets in one or more printheads. The index values for each pixel in the row correspond to numeric values for part of the memory address that identify each pixel within the row, such as the 12 least-significant bits of each memory address for the pixels in the row represent 4,096 pixel locations within the row, although the number of pixels and corresponding index sizes are different for different printer embodiments.

As used herein, the term "flag" refers to a data structure stored in a memory that controls the deactivation of an inkjet in a printhead independently of the pixels of image data that a controller uses to operate the inkjet during normal printing operations. In one embodiment the flag is a binary bit value that is set with either an activated state in which the inkjet ejects ink drops based on the values of pixel image data that are mapped to the inkjet or a deactivated state in which the controller deactivates the inkjet without regard to the contents of image data pixels corresponding to the inkjet. As described below, a controller in an inkjet printer generates output image data including pixel values that prevents operation of each inkjet that corresponds to the flag during a pass of one or more printheads in the printer. In some embodiments the flags for different inkjets are stored in lookup tables that correspond to individual passes of one or more printheads in an inkjet printer. Thus, a controller in the printer identifies the flags for inkjets during one pass and generates output image data that prevents operation of the flagged inkjets during the one pass, but the same inkjets may then be activated in a different pass during operation of the printer.

FIG. 1 depicts an inkjet printer 100 that is configured to perform multi-pass printing operations. The printer 100 includes an image receiving member 102, a printhead array 104, at least one set of actuators 108A/108B, a controller 128, and a memory 132. The image receiving member 102 provides a surface that receives drops of ink or other materials that are ejected from one or more printheads in the printhead array 104. In the illustrative example of FIG. 1 the image receiving member 102 is a planar support member that provides a base for the production of three-dimensional printed objects that the printer 100 forms during an additive manufacturing process. Other embodiments of the receiving member 102 include a sheet or elongated roll of a print medium such as paper, or an indirect image receiving member such as an endless belt or roll that receive the printed image and transfer the printed image to a print medium.

The printhead array 104 includes one or more inkjet printheads that eject drops of ink or other liquefied material toward the image receiving surface 102 to form printed images. In the printer 100, the actuators 108A and 108B are electromechanical actuators, such as stepper motors, that adjust the position of either the printhead array 104 (actuators 108A), the image receiving member (actuators 108B), or a combination thereof, during a printing operation in the printer 100. For example, in one configuration the actuators 108A move the printhead array 104 over the surface of the image receiving member 102 along the process direction axis P during each pass of a multi-pass printing operation. The actuators 108A also move the printhead array 104 along the cross-process direction axis CP between passes to move the printhead array 104 to a predetermined cross-process direction location prior to commencing each pass. In another embodiment, the actuators 108B move the image receiving member 102 along the process direction P and cross-process direction CP in a similar manner during a printing process. In yet another embodiment a combination of actuators 108A and 108B moves both the printhead 104 and image receiving member 102, such as a configuration in which the actuators 108B move the image receiving member 102 along the process direction P while the actuators 108A move the printhead array 104 along the cross-process direction CP. In an embodiment of the printer 100 that forms objects using an additive manufacturing process, at least one of the actuators 108A or 108B also adjusts a relative height between the printhead array 104 and the image receiving member 102 as the printer 100 forms successive layers of a three-dimensional printed object.

In the printer 100, the controller 128 is implemented using one or more very-large scale integrated circuit (VLSI) digital logic devices including, for example, one or more microprocessors, microcontrollers, field programmable gate arrays (FPGAs), digital signal processors (DSPs), application specific integrated circuits (ASICs) and the like. The controller 128 is operatively connected to the printheads in the printhead array 104, the actuators 108A/108B, and the memory 132. During operation, the controller 128 executes stored program instructions 136 that are stored in the memory 132 to control the operation of the printhead arrays 104 and to operate the actuators to form printed images in a multi-pass printing process based on input image data 140.

The memory 132 includes, for example, non-transitory digital data storage devices that include both volatile memory devices, such as random access memory (RAM), that retain information when supplied with electrical power and non-volatile memory devices, such as magnetic, optical, and solid-state data storage devices, that retain data in the presence or absence of electrical power. In the configuration of FIG. 1, the memory 132 stores the stored program instructions 136, two-dimensional input image data for one or more printed images 140, and a set of predetermined tables (LUTs) 144 that store predetermined memory index offset values that the controller 128 uses to adjust the index values of one or more pixels in each row of the input image data 140. The controller 128 generates output image data with the adjusted index values of pixels in the input image data to adjust the mapping between the pixels and the inkjets in the printhead array during different passes of a printing operation.

The image data 140 include, for example, a set of half-toned binary image data that include a plurality of rows of pixels. Each row of pixels corresponds to a cross-process direction line of printed drops in the printed image, and a series of the rows arranged along the process direction corresponds to the two-dimensional printed image.

A single column of pixels in the image data includes a single pixel from each row at a single index across multiple rows of the image data. By default, each column of pixels corresponds to one inkjet in a particular printhead when the controller 128 provides the image data row, or a portion of the row, to the printhead. For example, the image data 140 include a plurality a first plurality of pixels corresponding to a first row in an image to be formed during a first pass of one or more printheads in the printhead array 104. The memory 132 stores each pixel in the first plurality of pixels at a memory address corresponding to one index in a plurality of index values for the first row, where each index corresponds to one inkjet in the plurality of inkjets in the printhead. The image data 140 typically include a plurality of rows of pixels corresponding to two or more passes of the printheads with each pixel in each of the rows being located at a memory address corresponding to one index in a plurality of index values for one row and each index value corresponding to a single inkjet in one of the printheads in the printhead array 104. A column of the image data includes pixels from the multiple rows in the image data where each pixel occupies a single index in one of the rows.

The relationship between a particular column and the inkjet that ejects ink drops based on the pixel values within the column at a given index is fixed within the structure of the printhead and is not mutable during operation of the printhead. While the image data 140 are described as a single set of two-dimensional image data for illustrative purposes, those of skill in the art will recognize that in a multi-color or multi-material printer configuration the image data 140 include a separate set of two-dimensional image data, which are referred to as "color separations," for each ink color or material type that forms the printed image. The printer 100 operates inkjets in the printhead array 104 to form the printed image on the image receiving member 102 using image data in the different color separations to control corresponding sets of printheads and inkjets within the printheads during the multi-pass printing process.

In the memory 132, the tables 144 store a relationship between an index value corresponding to the relative memory address of a pixel within a row of data and a predetermined numeric index offset value that the controller 128 uses to generate output image data including rows of pixels that include the same pixel data as a corresponding row of input image data but with different index locations in the output row for at least some of the pixels from the input image data. For example, each entry in the table 144 corresponds to one index in the plurality of index values for a row of image data in a single pass of the printhead and each entry stores an index offset value that enables the controller 128 to generate a row of output image data in which the pixel at the first index is located at a second index, which corresponds to a different inkjet than the first index, in the output image data. The table 144 also stores flag values corresponding to inkjets in the printhead that the controller 128 uses to identify inkjets that are deactivated during selected passes of the printhead during the printing process. The tables 144 are generated and stored in the memory 132 prior to operation of the printer 100 to perform a multi-pass printing operation. Illustrative embodiments of the tables 144 include, for example, arrays, hash tables, key-value stores, binary search trees, or any other suitable data structure that associates the memory index value for a pixel in a row of input data with an index offset value that the controller 128 uses to assign the pixel data from an input row of image data to another index location in the row of output image data.

Figure 3:
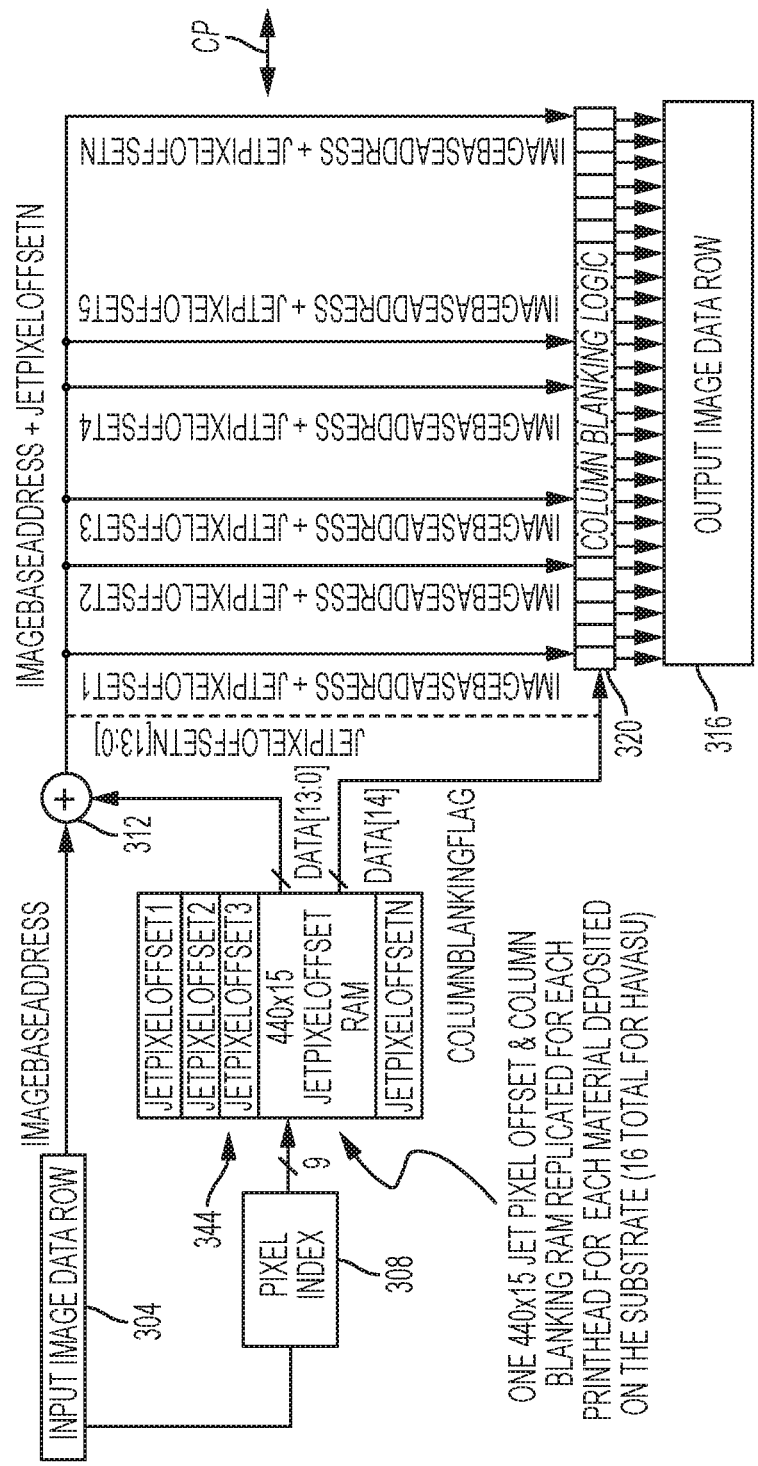
FIG. 3 is a schematic diagram of a table of index offset data that the printer of FIG. 1 uses to generate output image data from input image data.

FIG. 3 depicts an illustrative embodiment of one of the lookup tables 144 in use in the printer 100. In the embodiment of FIG. 3, a lookup table 344 includes a total of four-hundred forty (440) entries that correspond to an array of 440 inkjets in a single printhead in the printhead array 104. In the table 344, each entry includes a numeric memory index offset value ("JetPixelOffset") that is encoded as a signed or unsigned 14-bit number in an integer numeric range of either −8192 to 8191 or 0 to 16,384, although different embodiments encode the pixel offset data using different numeric ranges. As depicted in the FIG. 3, each entry in the table 344 is 15 bits in size while only 14 bits are used to store the index offset data. In the table 344, the most significant bit in each table entry is the flag bit that determines if an inkjet in the printhead that corresponds to the table entry is either activated or deactivated ("blanked") during the printing pass that corresponds to the table 344.

In the embodiment of FIG. 3, the controller 128 retrieves a row of input image data 304, where the row corresponds to at least a portion of the image data 140 that is supplied to the printhead to form one row in one pass of the printed image. In the printer 100 that uses multiple printheads and multiple print columns along the cross-process direction axis, the input image data row 304 for an individual printhead includes only a subset of the pixels in the image data 140 that correspond to a single printhead during the pass. In the embodiment of FIG. 3, the input image data row 304 includes 440 pixels that correspond to the 440 inkjets in the printhead.

The controller 128 uses the relative memory address index of each pixel in the input image data 304 as a pixel index 308 to address a corresponding entry in the lookup table 344. Controller 128 then performs an addition operation using a hardware or software adder 312 to add the 14 bit index offset value from the table 344 to the least significant bits of the memory address of the corresponding input pixel. The controller 128 stores the input pixel in an output image data row 316 at a different index than the input image data 304 based on the sum of the index for the pixel and the index offset value from the table 344. By default, each pixel in the input image data 304 corresponds to one inkjet in the printhead based on the relative index value of the pixel within the row. Similarly, each index in the output image data row 316 corresponds to the same inkjet in the printhead, but in the printer 100 the controller 128 changes the memory index locations of the pixels from the input image data to new index values in the output image data based on the entries in the table 344 to change the physical inkjet that ejects the ink drops from the default configuration of the printhead. Since the entries in the table 344 are signed or unsigned integers, the controller 128 uses the adder 312 to i modifies the index value of a memory address for any pixel to reassign the pixel to a new index corresponding to any inkjet in the printhead. In other embodiments, the controller 128 modifies the index values of the input image data row by replacing a portion of the input memory address data with the index offset data from the lookup table 344 or by performing an exclusive-OR (XOR) or other bit manipulation operation to generate the index values for the output image data 316.

In addition to changing the index values of pixels, the controller 128 uses the flag values stored in the table 344 to deactivate or "blank" selected inkjets in the printhead during the pass by overriding the pixel values in the output image data 316 with a default value that prevents the corresponding inkjet from ejecting an ink drop. In the example of FIG. 3, the flag is the most significant bit in each index offset entry of the table 344. If the flag is set (e.g. the bit value is "0" or another predetermined value), then the controller 128 deactivates the inkjet at the index of the output image data corresponding to the table entry. Thus, each entry in the table encodes two different logical operations: the index offset value changes mapping of the image data pixel from a default inkjet in the printhead to another inkjet, and the activation flag is used to either enable operation of the particular inkjet that corresponds to the entry in the table based on any image data that are mapped to the inkjet or to disable operation of the inkjet without regard to the index offset value.

In FIG. 3, the controller 128 uses the flags in the table 344 and a set of registers in column blanking logic 320 to set pixel values in the output image data 316 that prevent any deactivated inkjet from ejecting ink drops even if a set of input image data includes pixel values that normally operate the inkjet. For example, in one embodiment pixel values of "0" and "1" correspond to an instruction to not eject an ink drop or to eject an ink drop, respectively, at the pixel location in the printed image. In one configuration, the controller 128 places a logical "0" into each column of the blanking logic 320 that corresponds to an index of the table 344 with the blanking flag set, and the controller 128 places a logical "1" into the remaining columns. The controller 128 generates the output image data row by applying a logical AND operation to the pixel values in the output image data 316 to deactivate one or more inkjets based on the flag values stored in the table 344.

While the embodiment of FIG. 3 depicts a single-bit blanking flag that selectively deactivates certain inkjets, another embodiment uses a multi-bit flag configuration to provide additional controls for the operation of inkjets in printhead embodiments that use multiple sets of inkjets to print ink drops that have different sizes. Using a 16 bit register with a flag that contains 2-bits to operate and access the lower 14-bits may be advantageous by adjusting the behavior of the data in beyond providing the "blanking" function. For example, in a multi-level printhead where there's 2-drop sizes (e.g. 3-picoliter and 6-picoliters ink drops), one may be able to at least use one of the drop sizes in the column as opposed to blanking the entire column if the jet is defective during manufacturing or becomes defective during the print process. The two-bit flag embodiment enables the printer to encode 4 distinct operations of how to use the image-data to control the operation of different inkjets in a printhead. The following table depicts the operations that are encoded for one embodiment of a 2-bit flag:

| 2-Bit Flag | Action |
| --- | --- |
| 00 | Normal Operation |
| 01 | "Blank" entire Column |
| 10 | Only eject small (3 pL) drops |
| 11 | Only eject large (6 pL) drops |

Figure 4:
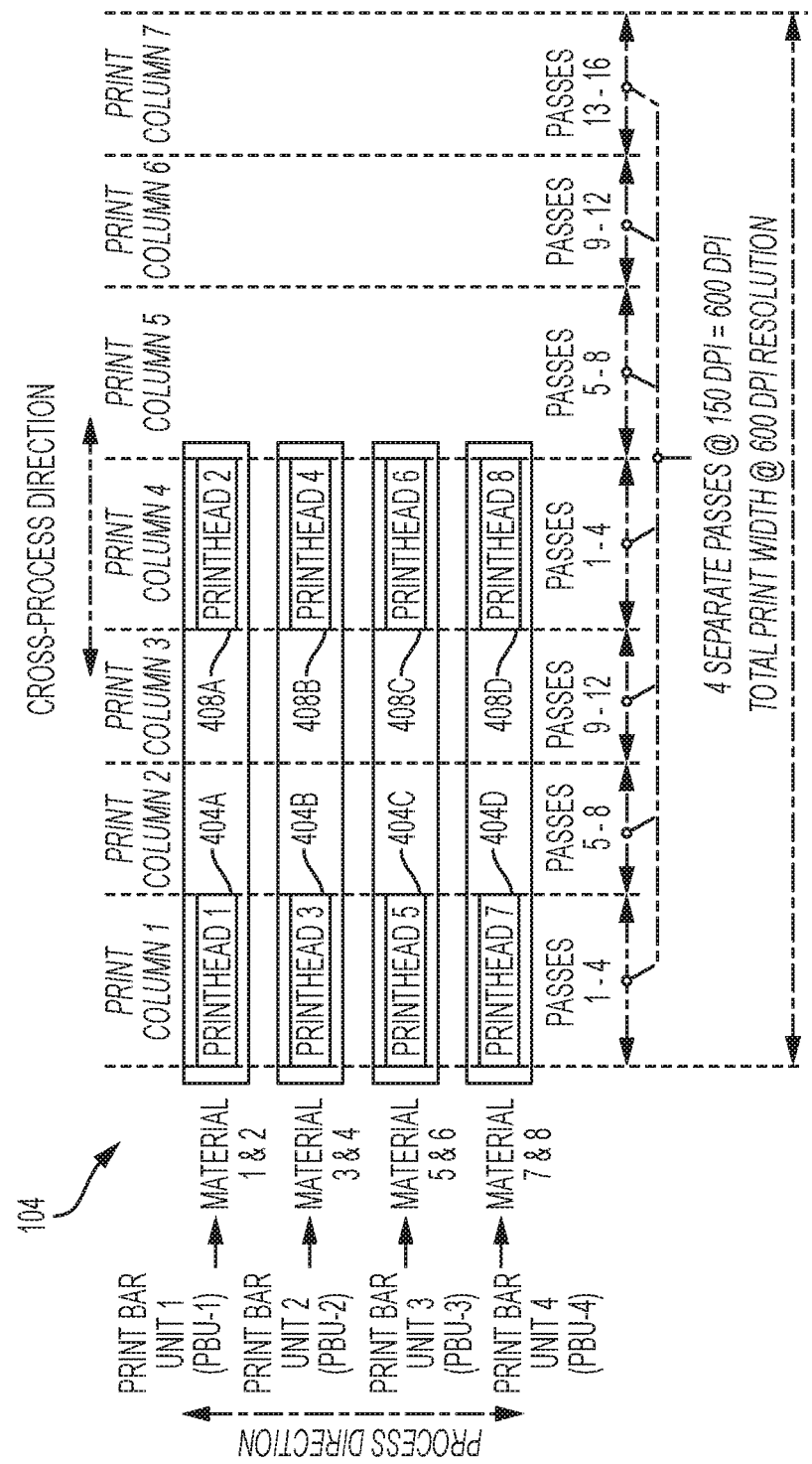
FIG. 4 is a schematic diagram of one embodiment of a printhead array that is suitable for use with the printer of FIG. 1.

During operation, the printer 100 performs a multi-pass printing process to form a printed image on the surface of the image receiving member 102 using at least two passes between the image receiving member 102 and the printhead array 104 to form the printed image. FIG. 4 depicts an illustrative example of the layout of printheads in the printhead array 104. In FIG. 4, an array of 8 printheads includes a first column of printheads 404A-404D and a second column of printheads 408A-408D. The printheads are mounted to a plate or other mounting member that holds the printheads at a fixed position relative to one another. In one configuration, the actuators 108A move the entire printhead array 104 in the cross-process direction between passes or the actuators 108B move the image receiving member 102 in the cross-process direction between passes to perform a multi-pass printing operation. FIG. 4 depicts an embodiment of a printhead array in the printer 100 for illustrative purposes, but other printhead array configurations are also suitable for use with the systems and processes that are described herein. Other suitable printhead arrays include, for example, a single printhead with an array of inkjets that forms printed images or three-dimensional printed objects using a single material, a single column including two or more printheads, three or more columns of printheads that each include two or more printheads, and a staggered configuration of printheads that are arranged end to end in a "stitch" alignment that is known to the art to form a continuous line of printed ink drops across a width of the printhead array in the cross-process direction.

In FIG. 4, each of the printheads 404A-404D and 408A-408D includes a two-dimensional array of inkjets that eject drops of a liquefied material toward the surface of the image receiving member 102. Furthermore, in the illustrative embodiment of FIG. 4, each of the printheads 404A-404D and 408A-408D includes two different fluid reservoirs that are fluidly coupled to different sets of inkjets in the printhead. Thus, each printhead effectively includes two different sets of inkjets that operate independently to eject drops of different types of materials, which could be inks with different colors or different types of materials that are used in additive manufacturing processes. In one embodiment, each printhead includes two arrays of inkjets that each includes 440 inkjets to eject drops of two types of material. The nozzle orifices of the inkjets are arranged in the printhead with a cross-process direction resolution of 150 nozzles per inch that produces printed images with a resolution of 150 dots per inch (DPI) for a single pass of each printhead.

In the illustrative embodiment of FIG. 4, the printer 100 performs four passes using the printheads 404A-404D and 408A-408D with each of the print columns 1-7 to produce a printed image with an effective resolution of 600 DPI within each print column. The actuators 108A or 108B move the printhead array 104 by small fractions of an inch within each print column to complete four interleaved passes that form a 600 DPI image in each print column. After completion of the four passes, actuators 108A or 108B produce a relative motion of the printhead array 104 by a larger amount (e.g. several inches) to reposition the printheads 404A-408B in a different print column to continue the multi-pass printing operation. For example, in FIG. 4 the printheads 404A-404D print in column 1 while the printheads 408A-408D print in column 4. After completing four passes, the printhead array 104 shifts in the cross-process direction to enable the printheads 404A-404D and 408A-408D to perform four passes in columns 2 and 5, respectively, similarly followed by columns 3 and 6, and finally the printheads 408A-408D print four passes in column 7 while the printheads 404A-408D remain deactivated.

Figure 5:
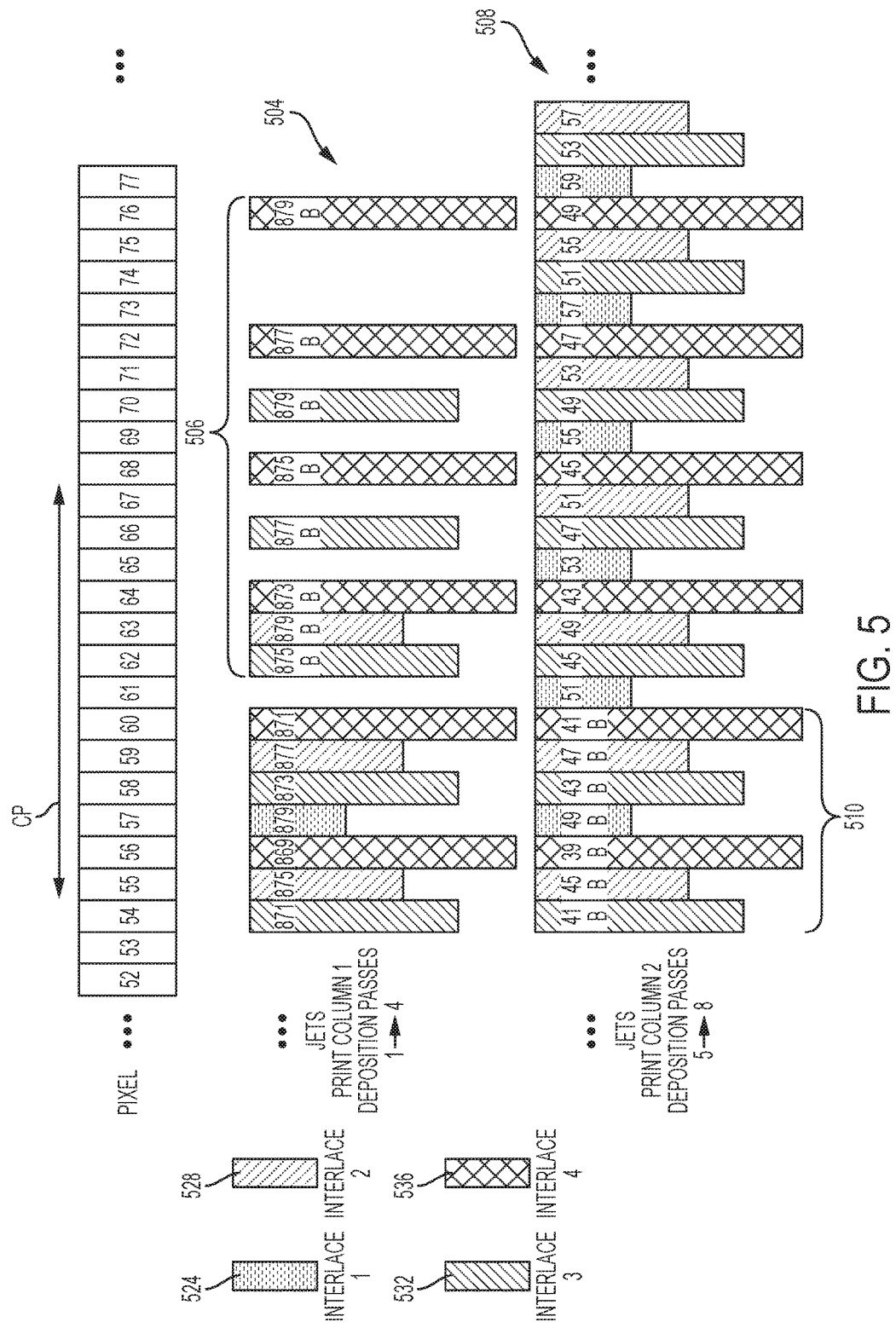
FIG. 5 is a diagram that depicts control requirements for the operation of inkjets in a printhead in overlapping between passes during a multi-pass printing operation.

During operation of the printer 100, the boundaries between the print columns along the cross-process direction present challenges to the operation of the printheads in the printhead array 104 because of the irregular arrangements of printed material drops that occur near the edges of the printed columns. For example, since the printheads perform multiple passes within each print column, the outer edges of printed columns in the cross-process direction often include gaps or other irregularities in the arrangement of printed marks. In the printer 100, the actuators 108A or 108B reposition the printhead array 104 between adjacent print columns with a predetermined degree of overlap at the edges of the columns. For each pair of adjacent print columns, which are referred as a first print column and a second print column, the printer 100 operates the printheads in the second column to fill the gaps at the edge of the first column and to ensure that overlapping inkjets do not eject drops of material multiple times over a single column of printed marks to produce a seamless transition in the printed image between the print columns 1-7. FIG. 5 depicts an illustration of cross-process direction arrangement of printed and non-printed or "blanked" columns 508 (indicated by a "B" in FIG. 5) corresponding to inkjets in a printhead for four passes ("interlaces") 524, 528, 532, and 536 in a region corresponding to a boundary between two printed columns. FIG. 5 depicts an interleaved arrangement of the input image data mapped to output image data columns for inkjets during four passes in a first print column 504 and the same four passes in a second print column 508. The overlapping regions between the two print columns include a set of blanked pixel columns 506 for the first print column 504 and another set of blanked pixel columns 510 for the second print column 508.

One challenge presented in the configuration of FIG. 5 is that existing printhead designs include a static mapping between each row of image data and the inkjets in the printhead that actually eject drops of ink or other material based on the image data. In a traditional printhead configuration, all of the inkjets in the overlapping region would be assigned to corresponding pixels in the input image data, which would produce an improper result in the overlapping regions of the printed image. In the printer 100, the controller 128 uses the lookup tables 144 based the specific pass during a multi-pass printing operation and optionally based on the location of the printhead in the printhead array 104 to generate output image data with modified index locations of pixels in each row of a printed image as is depicted above in FIG. 3. The modifications to the pixel locations enable the use of a printhead that employs a fixed mapping between image data and the physical inkjets that form the printed images to perform complex multi-pass printing operations such as the operation that is depicted above in FIG. 5 and in other printing operations without requiring a reconfiguration of the internal structure of the printhead.

Figure 2:
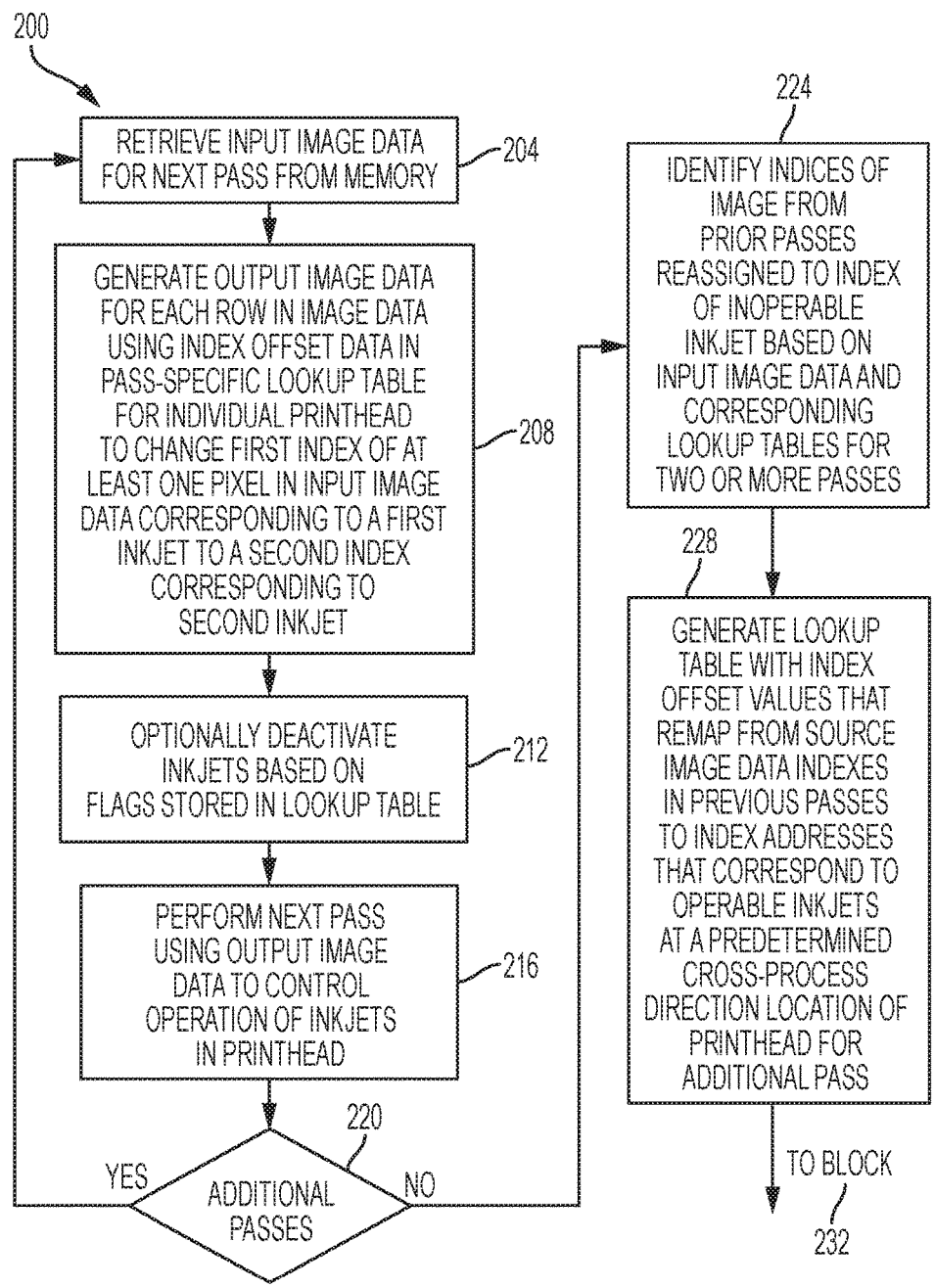
FIG. 2 is a block diagram of a multi-pass printing process in which a printer dynamically adjusts the memory address index values of pixels of image data to adjust the inkjets in one or more printheads that eject drops of ink to form each pass of a printed image.
Figure 2:
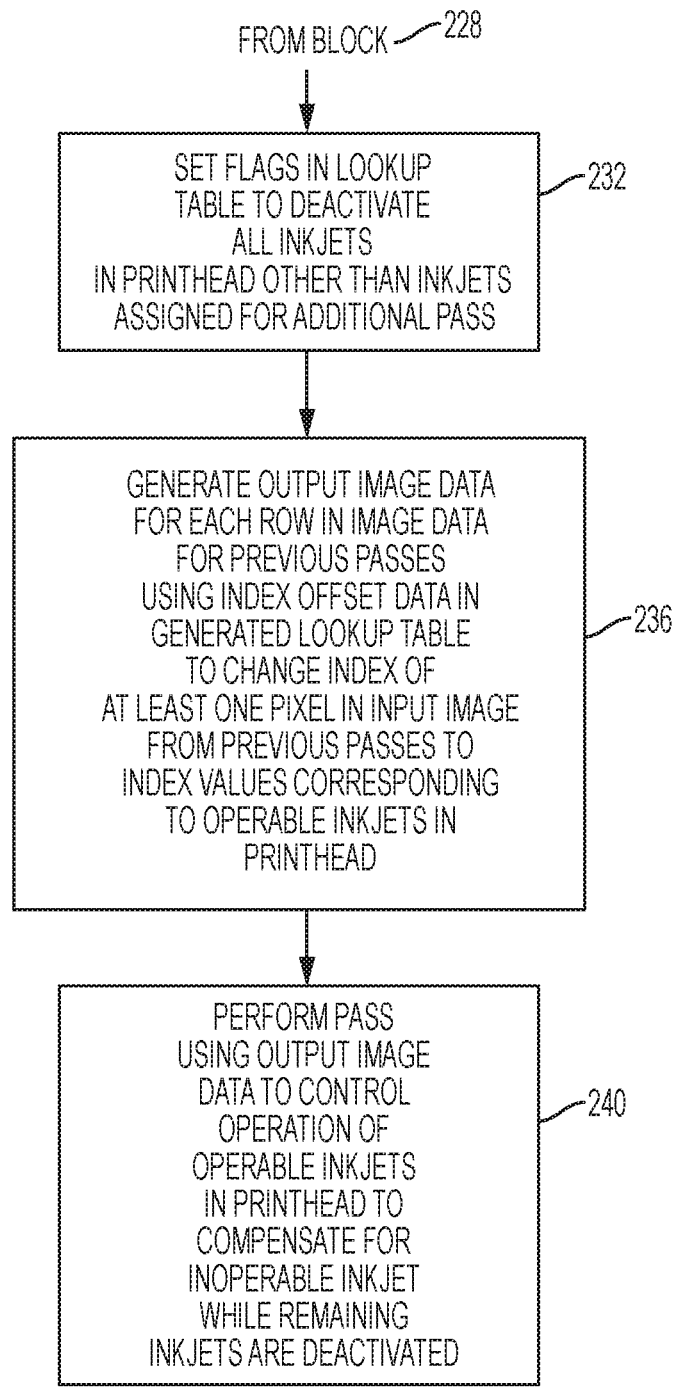

FIG. 2 depicts a block diagram of a process 200 for operation of an inkjet printer to perform a multi-pass printing process. In the description below, a reference to the process 200 performing a function or action refers to the operation of a controller to execute stored program instructions to perform the function or action in association with other components in an inkjet printer. FIG. 2 is described in conjunction with the printer 100 of FIG. 1 for illustrative purposes.

The process 200 begins as the controller 128 retrieves a set of input image data 140 for a next pass of the printhead in the printhead array 104 from the memory 132 (block 204). In particular, the controller 128 retrieves the input image data that control the operation of inkjets in at least one printhead in the printhead array 104, such as at least one of the printheads 404A-404D or 408A-408D depicted in FIG. 4, during the next pass from the memory 132. The input image data include at least one row of pixels that control the operation of inkjets in at least one of the printheads in the printhead array 104. In some embodiments the controller 128 retrieves the image data 140 in segments that include the pixels in a single row or a group of pixel rows from a larger set of image data corresponding to the next pass.

The process 200 continues as the controller 128 generates output image data for the next pass including at least one row of pixels that include at least two pixels with index locations in the output image data that are different from the input data using one of the tables of index offset data 144 that are stored in the memory 132 (block 208). In particular, the controller 128 generates first output image data including a second plurality of pixels with a first pixel from the input image data being stored in the output image data at a second index in the output image data with reference to the first index and an index offset value from an entry in the first table that corresponds to the first index. The controller 128 generates the output image data with a row of pixels that corresponds to each row of pixels in the input data with at least one pixel in the input image data being relocated from a first index to a second index in the output image data based on the contents of the lookup table 144 for the next pass. The operation of the controller 128 and one of the tables of index offset values 144 to generate the output image data in one embodiment of the printer 100 is described above in FIG. 3.

The controller 128 optionally identifies flag values in the lookup table data 144 and generates the output image data for each row including a pixel value that prevents operation of the first inkjet during the first pass in response to the identification of the flag (block 212). As described above regarding FIG. 3 and FIG. 5, the controller 128 generates the image data that prevent the operation of, or "blanks," selected inkjets in the printhead in overlapping regions between passes of two or more printheads to ensure that the inkjets do not eject drops of ink or another material more than once for a single set of image data. Additionally, as depicted in FIG. 4, the lookup table data 144 optionally include flags for every inkjet in a printhead to deactivate the entire printhead during some of the passes. In FIG. 4, the controller 128 identifies flags in the lookup tables 144 associated with the printheads 404A-404D and the passes for theses printheads in print column 4 while the printheads 408A-408D perform passes in printhead column 7. The controller 128 prevents the printheads 404A-404D from operating in print column 4 because in the embodiment of FIG. 4 the printheads 408A-408D have already formed a portion of the printed image in this print column.

Figure 6:
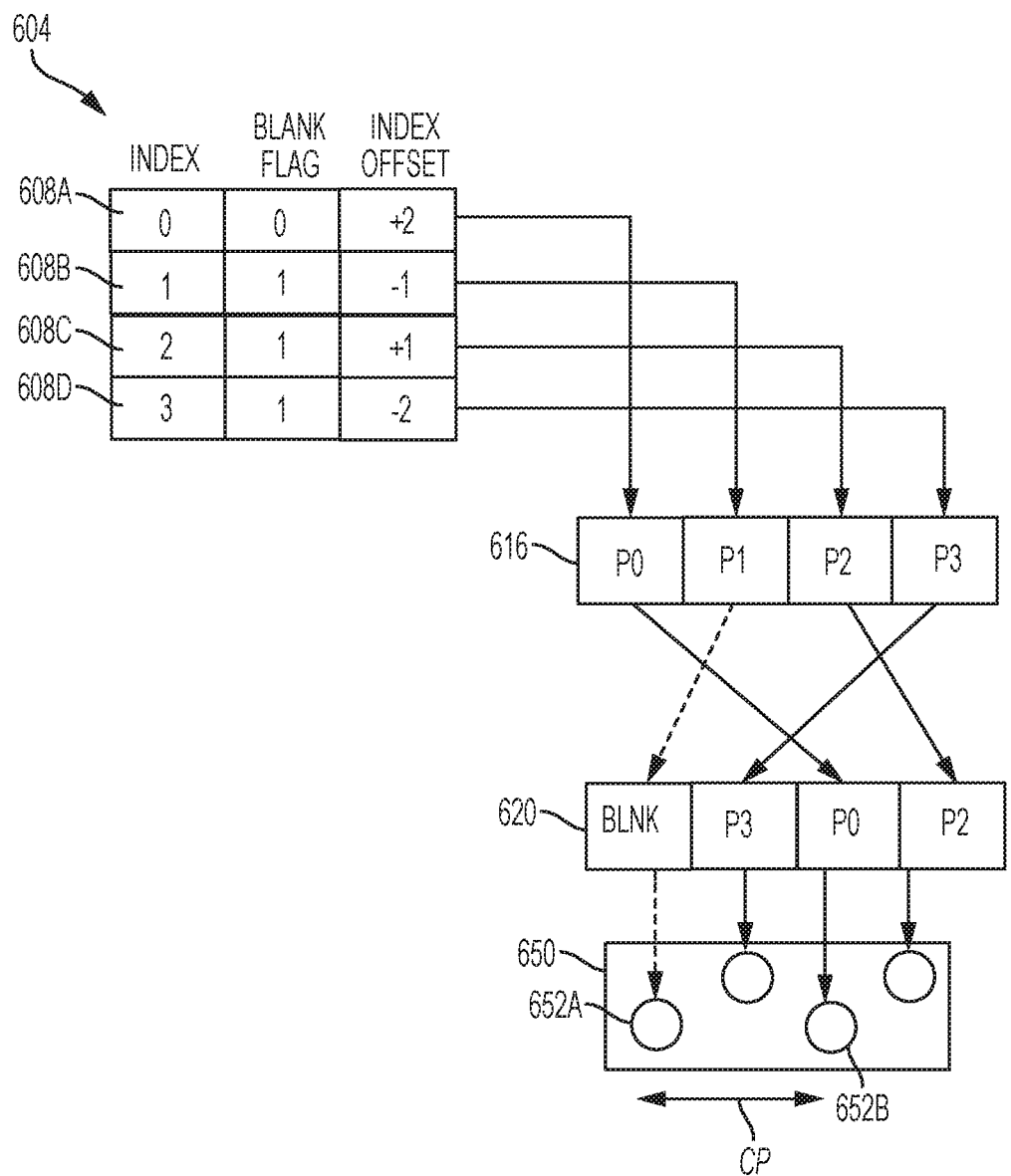
FIG. 6 is a diagram that depicts an operation to generate output image data from input image data using a table of index offset data in a simplified embodiment of the printer of FIG. 1.

FIG. 6 depicts another embodiment of a simplified version of a table of index offset values 604 for illustrative purposes. In FIG. 6 a lookup table 604 includes a total of four entries with index offset data for a simplified four-nozzle inkjet 650. While the example of FIG. 6 is simplified from most practical embodiments, this figure provides an explanation of the same processes that are used in the embodiment of FIG. 3 and other practical embodiments. In FIG. 6, the lookup table 604 includes entries 608A-608D with a total of four index values that correspond to the index values of pixels P0-P3 in a row of input image data 616. The controller 128 uses the index offset values in the entries of the lookup table 604 to generate the output image data row 620. For example, the controller 128 adds the index offset value of +2 in table entry 608A to the index of pixel P0 in the input image data 616 to generate the output image data 620 with the pixel P0 located at a second index that is shifted by +2 from the first index in input image data row.

As depicted in FIG. 6, the index 0 for pixel P0 corresponds to a first inkjet 652A in the printhead 650, but the output image data row 620 includes the pixel P0 at a second index that corresponds to a different inkjet 652B in the printhead 650. The controller 128 also identifies if any of the flags (the "blank flag" column) in the table 604 are set to generate the output data 620 with a pixel in each row of the output image data being set to a predetermined value that deactivates the corresponding inkjet in the printhead 650 if the flag is set. In the table 604, the "0" value corresponds to a set flag value in entry 608A and "1" is an unset flag. The controller 128 performs a logical AND operation with the "0" value flag to ensure that every pixel value in the output image data 620 at the index 0 for the inkjet 652A is set to a value ("BLNK" in FIG. 6) that prevents the inkjet 652A from ejecting an ink drop during the pass. In the embodiment of FIG. 6 the controller 128 copies the flag bits from the table 604 to a set of blanking registers, such as the registers 320 in FIG. 3, and performs the logical AND operation with each pixel in the output image data to generate the blanked pixel values that prevent the operation of any flagged inkjets in the printhead. The controller 128 prevents the inkjet 652 from ejecting any ink drops based on the image data in pixel P1 of the input data 616 in the example of FIG. 6. As noted above, the printer 100 does eject ink drops for the pixel P1 and other pixels at the index of pixel P1 in the image data during the process 200, but the printer 100 operates the printhead array 104 to eject the ink drops for these pixels during a different pass of the printhead array 104. Thus, the controller 128 uses the flags in the lookup table 604 to prevent the printhead 650 from ejecting multiple sets of ink drops for a single column of pixels in the image data 140.

During the process 200 the controller 128 uses the tables of index offset values 144 to generate output image data to change the inkjets in a printhead that eject drops of ink corresponding to the input image data. Since the controller 128 uses different predetermined sets of lookup tables 144 for the different passes of the printhead array 104 during the print job, the printer 100 remaps the input image data to different inkjets in the printheads of the printhead array 104 and selectively deactivates inkjets in the printhead between passes without requiring internal reconfiguration of the printheads themselves.

Referring again to FIG. 2, the process 200 continues as the printer 100 uses the generated output image data to control the operation of inkjets in one or more printheads in the printhead array 104 during the next pass of the printing operation (block 216). As depicted above in FIG. 1, during the pass the printhead array 104 and image receiving member 120 move along the process direction relative to each other as the controller 128 operates the inkjets in the printhead array 104 to eject drops of ink or another material based on the output image data for the pass. After completion of the pass, the actuators 108A or 108B adjust the relative position of the printhead array 104 along the cross-process direction axis for a subsequent pass in the multi-pass printing operation.

The process 200 continues with the processing that is described above in blocks 204-216 for each set of passes in the multi-pass printing process (block 220). During each pass, the controller 128 optionally uses a different set of lookup tables 144 to control the mapping of pixels in each row of the input image data 140 to the output image data. In the printer 100, the different sets of tables 144 enable the printer 100 to map a pixel at a first index in a first row of image data for a first pass to a second index in a row of output image data that corresponds to a second inkjet in the printhead that is different than a first inkjet of the printhead that otherwise corresponds to the first index. During a second pass, however, the printer 100 optionally uses a different lookup table 144 from the memory that maps a second pixel that is also located at the first index in a second row of image data for the second pass to a third, different, index that corresponds to a third inkjet in the printhead in the output image data for the second pass. Thus, during the process 200 the printer 100 uses different lookup tables 144 to change the specific inkjets in a printhead that eject ink drops between passes for pixels that are located at a single index in the input image data.

In some configurations of the process 200, the printer 100 performs one or more additional passes after completion of a standard multi-pass printing process to compensate for one or more inkjets in a printhead that were inoperable during the initial multi-pass printing process. Each inoperable or "missing" inkjet is clogged or otherwise non-functional in a printhead during the multi-pass printing process. In the printer 100, the controller 128 uses an identifier for an inoperable inkjet, such as an index value for the inkjet in the default mapping of image data to inkjets in the printhead, to generate another table of index offset values and additional output image data to compensate for the inoperable inkjet using operable inkjets in the printhead. The printer 100 identifies inoperable inkjets using processes that are otherwise known to the art and are not described in further detail herein. During the process 200, the actuators 108A/108B in the printer 100 adjust the relative position of the printhead array 104 in the cross-process direction CP to a location that enables one or more operable inkjets in a printhead to eject drops of ink or other materials onto the image receiving member 102 in locations that correspond to locations in which the inoperable inkjet was supposed to eject the drops during the multi-pass printing process.

Figure 7:
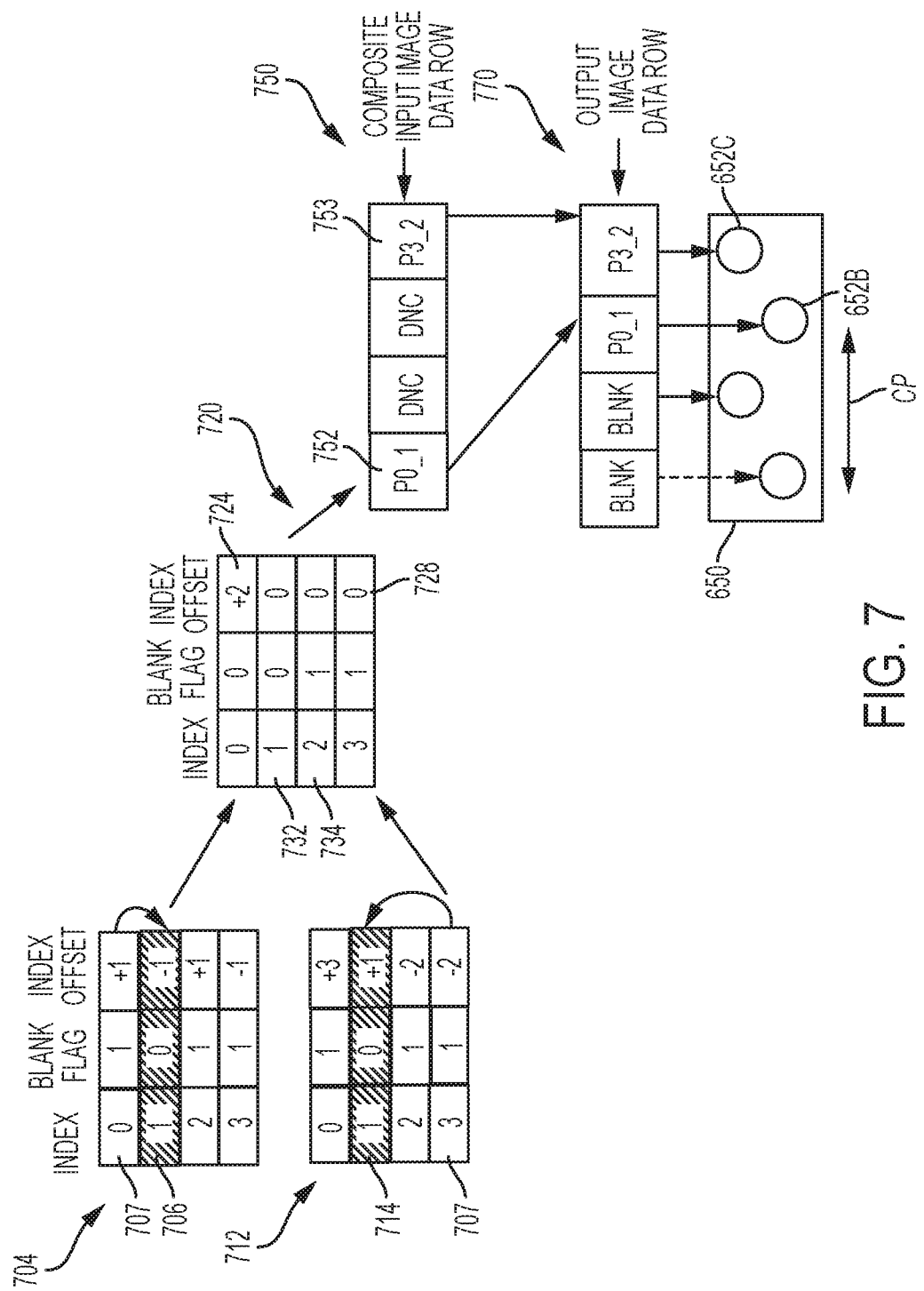
FIG. 7 is a diagram that depicts an operation to generate a table of index offset data for an inoperable inkjet compensation pass based on two tables of index offset data that were used in previous passes and input image data from multiple previous passes to generate output image data that control a printhead to compensate for an inoperable inkjet in a simplified embodiment of the printer of FIG. 1.

To compensate for an inoperable inkjet in a printhead, the controller 128 first identifies indices of image data from prior passes that were reassigned to the index of the output data that corresponds to the inoperable inkjet (block 224). Using the embodiment of FIG. 7 as an example, during one prior pass the controller 128 uses a first one of the lookup tables 144 to assign pixels at a first index from one or more rows of the input image data to the index that is associated with the inoperable inkjet. In FIG. 7 the lookup table 704 is used during a first pass in which the index 0 has an offset value that reassigns pixels to the index of an inoperable inkjet, which is given as entry 706 at index 1 in the example of FIG. 7. During the first pass, the process 200 assigns each of the pixels at index 0 to the inoperable inkjet. During a second pass, the controller 128 uses a different lookup table 712 to reassign the index values of the inkjets. The controller 128 identifies that the entry 707 assigns pixels at index 3 to the inoperable inkjet during the second pass.

During the process 200, the controller 128 searches the lookup tables 144 that are associated with the printhead during the prior passes to identify the index of each column of image data that was mapped to the index of the inoperable inkjet during one of the prior passes. Those of skill in the art will note that the input image data that were originally assigned to the index of the inoperable inkjet were printed during the previous passes in situations where the lookup table includes a non-zero offset value to modify the index of the pixels corresponding to the inoperable inkjet in the input data to different index values in the output data.

The process 200 continues as the controller 128 generates a new lookup table of index offset value entries that maps the index values that correspond to the inoperable inkjet in prior passes of the printhead array 104 to index values that are associated with operable inkjets in the printhead based on the predetermined cross-process direction location of the printhead during the additional pass (block 228). For example, in FIG. 7 the controller 128 generates the lookup table 720 with entries that correspond to index 0 as identified in the lookup table 704 and index 3 as identified in the lookup table 712. The lookup table 720 includes a first entry at index 0 with a first pixel offset value of +2 and a second entry at index 3 with a second pixel offset value of 0 to map the indices of the image data from the two prior passes to operable inkjets in the printhead 650.

The controller 128 identifies the index offset values for the table 712 based on a difference between the index of each source pixel that maps to the index of the inoperable inkjet and at least one index corresponding to an operable inkjet in the printhead at predetermined location in the cross-process direction axis for the additional pass that corresponds to a location of the inoperable inkjet in the cross-process direction during the previous passes. In FIG. 7, the index values 0 and 3 that map to index 1 of the inoperable inkjet are the source index values and the controller 128 identifies the offset values +2 and 0, respectively, which enable operation of two operable inkjets 652B and 652C during the additional pass to compensate for the inoperable inkjet. FIG. 7 depicts an example in which the controller 128 generates the offset values in the table 720 based on two previous passes of the printhead 650. In the additional pass of the printhead 650, the two operable inkjets 652B and 652C are located at the same cross-process direction location of the inoperable inkjet during the two prior passes, and the inoperable inkjet remains deactivated during the additional pass.

During the process 200, the controller 128 also sets the flags in the generated lookup table that correspond to all of the inkjets in the printhead that are not ejecting ink drops to compensate for the inoperable inkjet (block 232). In the example of FIG. 7, the controller 128 generates the flags with value "0" for table entries 724 and 732 corresponding to indices 0 and 1, respectively, since the inkjets that correspond to these entries do not eject drops of ink to compensate for the inoperable inkjet. Furthermore, the entry 732 corresponds to the index of the inoperable inkjet as depicted in tables 704 and 712.

The process 200 continues as the controller 128 generates output image data using input image data that corresponds to the identified index values of the inoperable inkjet in each of the previous passes and using the generated lookup table to map the index values from the input data to the indices that correspond to operable inkjets at the correct cross-process direction locations for the additional pass (block 236). Referring again to FIG. 7, the input image data 750 is a set of composite input image data that includes pixels from the input image data that were used in two or more multiple previous passes. For example, the pixels 752 at index 0 correspond to the input image data 140 at pixel index 0 for the first pass (P0_1) that mapped to the inoperable inkjet as identified in the lookup table 704. The pixels 753 at index 3 correspond to the input image data 140 at pixel index 3 for the second pass (P3_2) that mapped to the inoperable inkjet as identified in the lookup table 712. In the input image data 750, any index entry that does not correspond to image data that were provided to the inoperable inkjet during a previous pass are marked "do not care" (DNC) with a default pixel value. The controller 128 uses the newly generated lookup table of index offset values 720 to generate the output image data 770 from the input image data 750. In the example of FIG. 7, each row of the output image data 770 includes the pixel P0_1 from the first pass at index 2 and the pixel P3_2 from the second pass mapped to index 3. The controller 128 applies the flags in the table 720 to generate the blank (BLNK) pixel values that prevent the remaining inkjets in the printhead 650 from ejecting ink drops during the additional pass.

The process 200 continues as the controller 128 performs the additional pass to compensate for the inoperable inkjet and operates the inkjets in the printhead of the printhead array 104 based on the output image data 770 to compensate for the inoperable inkjet (block 240). As described above, in at least some configurations the printer 100 performs a single additional pass with the printhead using multiple operable inkjets to compensate for multiple sets of missing ink drops that corresponded to the inoperable inkjet during two or more prior passes.

While FIG. 2 depicts the additional pass to compensate for the inoperable inkjet in the printhead occurring after completion of other passes within a multi-pass printing process, the inoperable inkjet compensation pass can occur at other times during the printing operation in other embodiments. Additionally, in some configurations the printer 100 performs two or more additional passes with the printhead being located in different positions in the cross-process direction to situations where a single additional pass does not fully compensate for one or more inoperable inkjets in the printhead.

The process 200 described above depicts the operation of a single printhead in the printer 100 for illustrative purposes. In the printer 100, the controller 128 performs the process 200 for each printhead in the printhead array 104 using one of the pass-specific lookup tables 144 for each printhead in the printhead array 104 and each pass. In one configuration of the printer 100 each of the printheads in a column, such as the printheads 404A-404D or printheads 408A-408D in FIG. 4, use one of the lookup tables 144 during each pass. In other embodiments, individual printheads use different lookup tables during each pass. Furthermore, as described above for printheads that eject multiple types of material during operation, the controller 128 performs the process 200 for using separate sets of input image data 140 and lookup tables 144 for the different sets of inkjets in the printhead that eject the different material types.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An inkjet printer comprising:
    a printhead including a plurality of inkjets;
    a memory, the memory being configured to store:
        a plurality of image data including a first plurality of pixels corresponding to a first row in an image to be formed during a first pass of the printhead, each pixel in the first plurality of pixels being stored at one index in a first plurality of index values for the first row, each index corresponding to one inkjet in the plurality of inkjets; and
        a first table of index offset data including a first plurality of entries, each entry in the first plurality of entries corresponding to one index in the first plurality of index values and storing an index offset value; and
    a controller operatively connected to the printhead and the memory, the controller being configured to:
        retrieve a first pixel stored at a first index in the first plurality of pixels from the memory;
        generate first output image data including a second plurality of pixels with the first pixel being stored in the output image data at a second index in the output image data with reference to the first index and an index offset value from an entry in the first table corresponding to the first index; and
        operate the second inkjet in the printhead to eject at least one ink drop with reference to the first pixel at the second index in the first output image data during the first pass of the printhead in the inkjet printer, the second inkjet being different than the first inkjet.

2. The inkjet printer of claim 1, the memory being further configured to store:
    the plurality of image data including a third plurality of pixels corresponding to a second row of the image to be formed during a second pass of the printhead, each pixel in the third plurality of pixels being stored at one index in a second plurality of index values for the second row, each index corresponding to one inkjet in the plurality of inkjets; and
    a second table of index offset data including a second plurality of entries, each entry in the second plurality of entries corresponding to one index in the second plurality of index values and storing an index offset value; and
    the controller being further configured to:
        retrieve a second pixel stored at the first index in the third plurality of pixels from the memory;
        generate second output image data including a fourth plurality of pixels with the second pixel being stored in the second output image data at a third index in the second output image data with reference to the first index and an index offset value from an entry in the second table corresponding to the first index; and
        operate the third inkjet in the printhead to eject at least one ink drop with reference to the second pixel at the third index in the second output image data during a second pass, the third inkjet being different than the first inkjet and the second inkjet.

3. The inkjet printer of claim 2, the controller being further configured to:
identify a third pixel at a fourth index in the first plurality of pixels that corresponds to the inoperable inkjet during the first pass with reference to the first table of index offset data and an identifier corresponding to the inoperable inkjet;
identify a fourth pixel at a fifth index in the third plurality of pixels that corresponds to the inoperable inkjet during the second pass with reference to the second table of index offset data and the identifier corresponding to the inoperable inkjet;
generate a third table of index offset data, the third table comprising:
a first entry corresponding to an index of the third pixel, the first entry including a pixel offset value corresponding to a difference between the index of the third pixel and a sixth index corresponding to an operable inkjet in the printhead at a location in a cross-process direction axis for a third pass that corresponds to a location of the inoperable inkjet in the cross-process direction during the first pass; and
a second entry corresponding to an index of the first pixel, the first entry including a pixel offset value corresponding to a difference between the index of the fourth pixel and a seventh index corresponding to another operable inkjet in the printhead at a location in the cross-process direction axis for the third pass that corresponds to a location of the inoperable inkjet in the cross-process direction during the second pass;
generate third output image data including a fifth plurality of pixels with the third pixel being stored in the third output image data at the sixth index in the third output image data with reference to the fourth index and the index offset data from the entry in the third table corresponding to the fourth index, and the fourth pixel being stored in the third output image data at the seventh index in the third output image data with reference to the fifth index and the index offset data from the entry in the third table corresponding to the fifth index;
operate a fourth inkjet in the printhead to eject at least one ink drop with reference to the third pixel at the sixth index in the third output image data during a third pass, the fourth inkjet being different than the inoperable inkjet; and
operate a fifth inkjet in the printhead to eject at least one ink drop with reference to the fourth pixel at the seventh index in the third output image data during the third pass, the fifth inkjet being different than the inoperable inkjet and the fourth inkjet.

4. The inkjet printer of claim 3, the controller being further configured to:
generate the third table of index offset data including a flag in each entry of a third plurality of entries in the third table other than the first entry and the second entry; and
generate the third output image data including the fifth plurality of pixels with a pixel value that prevents operation of each inkjet in the plurality of inkjets in the printhead other than the fourth inkjet and the fifth inkjet during the third pass in response to the flag being present in each of the third plurality of entries in the third table.

5. The inkjet printer of claim 1, the controller being further configured to:
identify the second index for the first pixel with reference to a sum of the first index of the first pixel in the memory and the index offset value from the entry in the first table corresponding to the first index.

6. The inkjet printer of claim 1, the controller being further configured to:
identify a flag included in the entry of the table corresponding to the first index; and
generate the second plurality of pixels including a pixel value that prevents operation of the first inkjet during the first pass in response to the identification of the flag.

7. A method for operating an inkjet printer comprising:
retrieving, with a controller, a first pixel from a first index in a first plurality of pixels stored in a memory, the first plurality of pixels corresponding to a first row in an image to be formed during a first pass of a printhead, the first index of the first pixel corresponding to a first inkjet in a plurality of inkjets in the printhead;
identifying, with the controller, a first index offset value for the first pixel with reference to a first table of index offset data stored in the memory and the first index of the first pixel;
generating, with the controller, first output image data including a second plurality of pixels with the first pixel being stored in the output image data at a second index in the output image data with reference to the first index and the first index offset value, the second index corresponding to a second inkjet in the plurality of inkjets in the printhead; and
operating, with the controller, the second inkjet in the printhead to eject at least one ink drop with reference to the first pixel at the second index in the first output image data during the first pass of the printhead in the inkjet printer, the second inkjet being different than the first inkjet.

8. The method of claim 7 further comprising:
retrieving, with the controller, a second pixel from the first index in a third plurality of pixels stored in the memory, the third plurality of pixels corresponding to a second row in the image to be formed during a second pass of the printhead, the first index of the second pixel corresponding to the first inkjet in the plurality of inkjets in the printhead;
identifying, with the controller, a second index offset value for the second pixel with reference to a second table of index offset data stored in the memory and the first index of the second pixel;
generating, with the controller, second output image data including a third plurality of pixels with the second pixel being stored in the output image data at a third index in the output image data with reference to the first index and the second index offset value, the third index corresponding to a third inkjet in the plurality of inkjets in the printhead; and
operating, with the controller, the third inkjet in the printhead to eject at least one ink drop with reference to the second pixel at the third index in the second output image data during the second pass of the printhead in the inkjet printer, the third inkjet being different than the first inkjet and the second inkjet.

9. The method of claim 8 further comprising:
identifying, with the controller, a third pixel at a fourth index in the first plurality of pixels that corresponds to the inoperable inkjet during the first pass with reference to the first table of index offset data and an identifier corresponding to the inoperable inkjet;

identifying, with the controller, a fourth pixel at a fifth index in the third plurality of pixels that corresponds to the inoperable inkjet during the second pass with reference to the second table of index offset data and the identifier corresponding to the inoperable inkjet;

generating, with the controller, a third table of index offset data, the third table comprising:
  a first entry corresponding to an index of the third pixel, the first entry including a pixel offset value corresponding to a difference between the index of the third pixel and a sixth index corresponding to an operable inkjet in the printhead at a location in a cross-process direction axis for a third pass that corresponds to a location of the inoperable inkjet in the cross-process direction during the first pass; and
  a second entry corresponding to an index of the first pixel, the first entry including a pixel offset value corresponding to a difference between the index of the fourth pixel and a seventh index corresponding to another operable inkjet in the printhead at a location in the cross-process direction axis for the third pass that corresponds to a location of the inoperable inkjet in the cross-process direction during the second pass;

generating, with the controller, third output image data including a fifth plurality of pixels with the third pixel being stored in the third output image data at the sixth index in the third output image data with reference to the fourth index and the first entry of the third table, and the fourth pixel being stored in the third output image data at the seventh index in the third output image data with reference to the fifth index and the second entry of the third table;

operating, with the controller, a fourth inkjet in the printhead to eject at least one ink drop with reference to the third pixel at the sixth index in the third output image data during the third pass in the inkjet printer, the fourth inkjet being different than the inoperable inkjet; and operating, with the controller, a fifth inkjet in the printhead to eject at least one ink drop with reference to the fourth pixel at the seventh index in the third output image data during the third pass, the fifth inkjet being different than the inoperable inkjet and the fourth inkjet.

10. The method of claim 9 further comprising:

generating, with the controller, the third table of index offset data including a flag in each entry of a third plurality of entries in the third table other than the first entry and the second entry; and generating, with the controller, the third output image data including the fifth plurality of pixels with a pixel value that prevents operation of each inkjet in the plurality of inkjets in the printhead other than the fourth inkjet and the fifth inkjet during the third pass in response to the flag being present in each of the third plurality of entries in the third table.

11. The method of claim 7, the generating of the second plurality of pixels further comprising:

identifying, with the controller, the second index for the first pixel with reference to a sum of the first index of the first pixel in the memory and the index offset value from the entry in the first table corresponding to the first index.

12. The method of claim 7, the generating of the second plurality of pixels further comprising:

identifying, with the controller, a flag included in the entry of the table corresponding to the first index; and generating, with the controller, the second plurality of pixels including a pixel value that prevents operation of the first inkjet during the first pass in response to the identification of the flag.

* * * * *